US009396656B2

(12) United States Patent
Cazanas et al.

(10) Patent No.: US 9,396,656 B2
(45) Date of Patent: Jul. 19, 2016

(54) ACCIDENT PREVENTION SYSTEM (71) Applicant: Cellco Partnership, Arlington, VA (US)

(72) Inventors: Carlos A. Cazanas, Bethlehem, PA (US); Kalpan S. Shah, Bridgewater, NJ (US); Phillip A. Leone, Frenchtown, NJ (US); Victor M. Pagan, Breinigsville, PA (US)

(73) Assignee: Cellco Partnership, Basking Ridge, NJ (US)

( * ) Notice: Subject to any disclaimer, the term of this patent is extended or adjusted under 35 U.S.C. 154(b) by 174 days.

(21) Appl. No.: 14/134,552

(22) Filed: Dec. 19, 2013

(65) Prior Publication Data
US 2015/0179069 A1    Jun. 25, 2015

(51) Int. Cl.
*G08G 1/09* (2006.01)
*G08G 1/0967* (2006.01)
*G01C 21/36* (2006.01)

(52) U.S. Cl.
CPC ...... *G08G 1/096775* (2013.01); *G01C 21/3697* (2013.01); *B60W 2530/10* (2013.01)

(58) Field of Classification Search
CPC . G01C 21/3697; G08G 1/0962; G08G 1/164; G08G 1/161; B60W 2530/10; G01G 19/03
See application file for complete search history.

(56) References Cited

U.S. PATENT DOCUMENTS

| 6,864,784 | B1* | 3/2005 | Loeb | 340/441 |
|---|---|---|---|---|
| 2002/0008637 | A1* | 1/2002 | Lemelson et al. | 340/907 |
| 2005/0083211 | A1* | 4/2005 | Shafir et al. | 340/905 |
| 2005/0267658 | A1* | 12/2005 | Yuan et al. | 701/36 |
| 2007/0032245 | A1* | 2/2007 | Alapuranen | 455/456.1 |
| 2008/0001718 | A1* | 1/2008 | Karabinis | 340/10.3 |
| 2009/0024336 | A1* | 1/2009 | Tatom | G01G 23/3728 702/56 |
| 2010/0007523 | A1* | 1/2010 | Hatav | 340/901 |
| 2011/0227759 | A1* | 9/2011 | Aunkofer et al. | 340/905 |

* cited by examiner

Primary Examiner — Omeed Alizada (57) ABSTRACT

A vehicle system may include a communication device configured to receive road data. The system may also include an application, having a processor and a memory, configured to analyze the road data in view of the at least one vehicle attribute included in vehicle data. The application may also determine whether the road data is relevant and transmit, in response to the road data being relevant, a command to a display unit to display information based on the analysis of the road data.

19 Claims, 7 Drawing Sheets

310 — VIN: 9F04U432831
Current Weight: 67,983 lbs
320 — Last Weigh-In: 9.18.2013 22:00

| Marker ID | 715 | 734 | 902 |
|---|---|---|---|
| Static Attributes | Bridge, 10 miles, 13' clearance | Weigh Station, 5 miles | |
| Dynamic Attributes | Traffic accumulating 20 miles | Construction, 10 miles | Traffic on bridge, bridge weight at 173,450 lbs, weight limit 200,000 lbs. |

335 — Marker ID row
340 — Static/Dynamic Attributes
350 —

ACCIDENT PREVENTION SYSTEM

BACKGROUND INFORMATION

Global Positioning Systems (GPS) exist to aid vehicles in navigation. Such systems may also divert a vehicle based on certain information regarding the current travel path of the vehicle. This information may include, by way of example, instances of traffic or road closures. However, current systems fail to analyze such data in view of attributes specific to the vehicle.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows:

DETAILED DESCRIPTION

An exemplary system described herein includes a vehicle system having a communication device such as a near frequency communication (NFC) chip and a vehicle application configured to receive road data from a marker arranged within a roadway having a separate communication device. The marker may maintain road data of potential interest to a vehicle passing within communications range of the marker (e.g., it may include information about an upcoming obstruction such as a bridge or road closure). The vehicle system communication device, which may be embedded in part within a tire pressure management system in one illustrative approach, may be configured to read the information from the roadway marker communication device when the vehicle crosses the marker. In this example, the two communication devices are in close proximity to one another when data is transferred. The vehicle application may analyze the data received by its communication device and determine whether the data received (e.g., an upcoming obstruction) is of importance to the vehicle. Upon such determination, the vehicle application may transmit a message to a display unit of the vehicle, recommending or even instructing the vehicle to take an alternate route. The determination may be based in part on vehicle attributes specific to the vehicle such as the vehicle's weight, height, etc.

The system may also include a central authority remote from both the vehicle and the marker, but configured to communicate with the marker. The marker, in addition to providing data to the vehicle, may also collect vehicle data. The vehicle data may include static vehicle attributes (e.g., a vehicle identification associated with the vehicle and vehicle ownership identification) and dynamic vehicle characteristics (e.g., vehicle speed, fuel levels, and timing between locations). In one example, if the vehicle data indicates that the vehicle has not stopped at a weight station for a predetermined amount of time or distance, the central authority may send a message to the display of the vehicle to instruct the vehicle to stop at an upcoming station. Further, if the central authority determines that the vehicle has failed to comply with the message, the central authority may take a remedial action against the vehicle, such as applying a fine using the vehicle ownership identification, for missing the weight station. In another example, if there is a roadway obstruction, the central authority may analyze the vehicle data to determine whether the vehicle should be instructed to take an alternate route. Thus, the system described herein is configured to analyze certain attributes of road data and vehicle data to increase compliance with municipal regulations as well as to improve the overall safety of the roadways.

Figure 1:
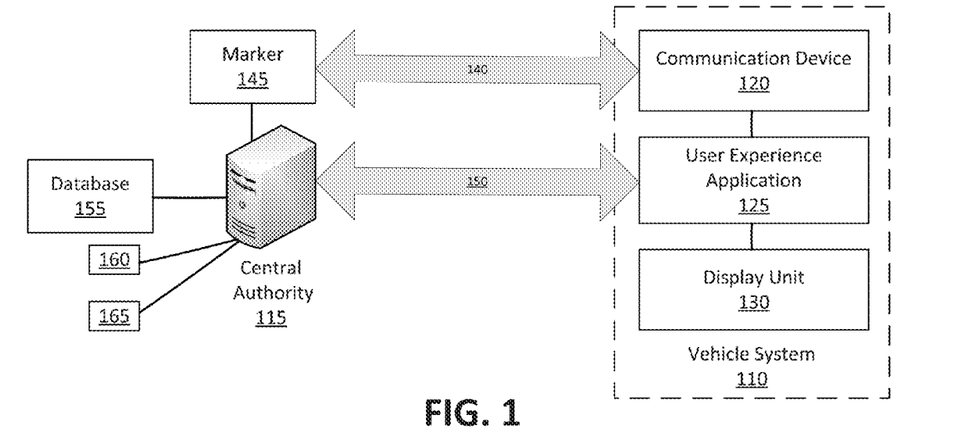
FIG. 1 is an exemplary system for an accident prevention system.

FIG. 1 shows an exemplary system 100 including a vehicle system 110 configured to communicate with a central authority 115. The vehicle system 110 may include a communication device 120, a user experience application 125, and a display unit 130. The central authority 115 may be in communication with the vehicle system 110 via a remote communication system such as a marker 145. The central authority 115 may also be in communication with a database 155.

The vehicle system 110 may be a system within a vehicle configured to alert the vehicle, and the driver thereof, of certain upcoming physical road characteristics, such as a bridge, traffic jam, road closure, etc. The communication device 120 within the vehicle system 110 may be a device configured to send and/or transmit data between the marker 145 and the vehicle system 110. It may be located within or on the vehicle. It may be part of an existing system, such as a tire pressure management system (TPMS) located within a tire of the vehicle. The communication device 120 may include a transmitter and/or a receiver. The communication device 120 may be, for example, an (NFC) chip. Generally, an NFC chip is capable of creating an electromagnetic field, shown by communication path 140, with another NFC device (e.g., marker 145) to transmit information. An NFC chip may be powered by an electromagnetic field created by the marker 145, thereby not requiring a separate power source such as a battery. The NFC chip may also be powered by components within the vehicle system 110. In one example, the communication device 120 may be powered by the vehicle's electronic power or another power source such as a battery. Upon detecting the marker 145, or other NFC device, the communication device 120 may transmit the vehicle data to the marker 145.

While described as an NFC chip herein, the communication device 120 may also be any device capable of transmitting data within a short distance, such as other radio frequency communication devices. In another exemplary approach, for example, communication device 120 may be capable of utilizing the Bluetooth short range communication protocol, typically having a range on the order of more than twenty (20) to thirty (30) feet as compared to a range up to several inches for the even more short ranged communication protocol associated with NFC. In either case, the communication device 120 may be within an inch or less of its mated component. The communication device 120 may be included in a TPMS of a vehicle. These systems are typically installed in large vehicles such as trucks and other cargo carriers to monitor the air pressure inside the tires of the vehicle. Such systems may use radio-frequency communication to transmit the relative tire pressures to the vehicle system 110, or other medium. The components within the TPMS of each tire may include the appropriate architecture for the communication device 120. That is, the components used to transmit the tire pressure information may also transmit the vehicle data to the marker 145.

The vehicle data transmitted from the vehicle system 110 to the marker 145 may include a static attribute, such as a vehicle identification number (VIN) and at least one dynamic attribute associated with the vehicle. The vehicle attributes may include information specific to the vehicle, such as the vehicle's weight, dimensions, location, etc. This vehicle data is described in more detail with respect to FIG. 3A, herein.

The communication device 120 may also be configured to receive information from the marker 145. This information may be road data and include information about the upcoming roadway. Such road data may include physical road characteristics or upcoming road situations. In one example, an upcoming overpass or bridge with a low clearance height may be included in the road data. The road data may then be used by the vehicle system 110 to alert the vehicle of the upcoming obstruction. Other examples include traffic situations, road closures, poor weather, etc.

The user experience application 125 may be an application within the vehicle system 110 for analyzing received data, e.g., the road data. It may also be in communication with the display unit 130. The user experience application 125 may receive road data from the communication device 120. It may then determine whether the data is of importance and if it is, it may transmit a message or command to the display unit 130 so that the display unit 130 may alert the vehicle and the driver as to the relevant road characteristics. The application 125 may also communicate directly with the central authority 115 via a communication path 150. Communication path 150, for example, may be facilitated by a wireless network such as Wi-Fi, Bluetooth, cellular networks, ad-hoc wireless networks (e.g., Zigbee® or Z-Wave), etc. using their associated communication protocols. It may also include a combination of wired and wireless communication protocols.

The application 125, in one example, may use the vehicle's attributes to determine whether the road data is relevant to the vehicle. The road data may be determined to be relevant if an issue with the vehicle's path of travel is realized in view of the road data (e.g., construction, bridge, traffic). The vehicle attributes within the vehicle data may also be determined to be relevant if a safety issue with the vehicle is realized, independent of any road data (e.g., vehicle weight, brakes, etc.). The application 125 may analyze both static and dynamic attributes of both the road data and vehicle data. Generally, a static attribute is an unchanging, or fixed characteristic associated with the item of interest. It may usually represent a permanent physical aspect such a Vehicle identification number (VIN) or the height of a bridge while a dynamic attribute is a potentially changing and unfixed characteristic associated with the item of interest. It may usually represent a physical aspect that changes as circumstances change. Vehicle speed or the amount of weight applied to a bridge as vehicles travel over it are examples of dynamic attributes. In a more specific example, if the communication device 120 receives road data indicating that the vehicle is approaching a bridge or overpass with a low clearance height, the application 125 may then determine whether the vehicle height exceeds this clearance. That is, the application 125 may compare the clearance height of the bridge with the known vehicle height to determine whether or not the bridge poses a problem for the vehicle. Thus, the static road attribute (i.e., the approaching bridge clearance) may be compared with a static vehicle attribute (i.e., the vehicle height). In another situation, the vehicle's weight may be added to the current weight on a bridge to determine whether the bridge weight limit would be exceeded if the vehicle were to proceed to cross the bridge. This may be the example shown in FIG. 3B for marker ID 902. In this situation, two dynamic attributes are compared (i.e. the weight of the vehicle and the total weight on the bridge.)

The road data may also be determined to be relevant regardless of any specific vehicle attribute. For example, if a weather emergency is received by the application 125 from the marker 145, the application 125 may determine that this is relevant information regardless as to any vehicle properties. Thus, the marker 145 may be used to communicate network wide announcements or localized announcements (e.g., that flooding has closed the road ahead) to passing by vehicles. Other examples may include traffic and construction alerts.

The display unit 130 may be located within the dashboard, console or steering wheel of the vehicle so as to be visible to the driver. The display unit 130 may be configured to inform the driver of certain road characteristics such as an upcoming bridge or weigh station. The display unit 130 may be a heads-up display (HUD) unit within the vehicle. The HUD unit may present information to the driver by projecting the information on the windshield of the vehicle. One advantage to using a HUD unit is that the driver does not need to adjust his or her line of sight while driving to review the information because the information is displayed on the windshield. Further, in instances where the displayed information relates to an object on or long the roadway, the information may be displayed on the windshield in an appropriate location so as to appear on that object. That is, if the approaching bridge is within sight of the vehicle, the bridge height may be displayed on the windshield so as to clearly indicate to the driver the height of the bridge. The bridge height may be displayed along with a height of the vehicle and/or, if necessary, a notification that the vehicle exceeds the bridge height.

In another example, if it is determined that the vehicle should proceed via a specific alternative route to avoid an issue, an arrow pointing to the appropriate roadway may be displayed on the windshield. In this example, an arrow may point towards an exit or an alternate route. Turn-by-turn directions may also be displayed via the HUD unit.

The HUD unit may also display certain warnings to the driver. These warnings may be textual or pictorial warnings. For example, a scrolling text string may be displayed such as "Warning: traffic ahead, alternate route suggested." In another example, flashing arrows may point towards an obstruction (e.g., a bridge with a low clearance height). Other instructions, such as "Stop at the next weight station," may also be displayed via the HUD unit.

While the above exemplary information is described as being displayed by a HUD unit, the display unit 130 may also be any number of other types of displays. For example, the display unit 130 may be a liquid-crystal display (LCD) display within the center console or dashboard of the vehicle. The display may also be a light emitting diode (LED) display or any other type of electronic visual display.

The central authority 115 may be a central server configured to maintain various information including but not limited to vehicle data, road data, municipality data, security data, etc. The central authority 115 may include a processor 160 and memory 165 and may be configured to process incoming vehicle data from the marker 145 and determine if any of the vehicle attributes included in the vehicle data are of any relevance. The central authority 115 may be in communication with the marker 145 and may receive vehicle data from the marker 145. That is, the communication device 120 of a vehicle may transmit vehicle data to the marker 145, which in turn may transmit the received data to the central authority 115. The central authority 115 may also transmit data to the marker 145 so that the communication device 120 may receive updated and relevant data from the central authority 115. In one example, the central authority 115 may transmit road data to the marker 145 that includes traffic information. The central authority 115 may then transmit updated traffic information to the marker 145 as appropriate in an effort to keep the road data current and relevant.

An advantage of system 100 is that it can be integrated into both a vehicle and into the surrounding geography such that issues related to accessibility, reliability, and compatibility are addressed. For example, even if a central authority 115 becomes unavailable for periods of time, remaining elements of the system may continue to communicate with each other and to provide useful information (e.g., the safe weight load for an oncoming bridge may be communicated to a vehicle from one or more successive markers based on the weight of the specific vehicle transmitted to the marker 145 as a contributor to the total weight). Moreover, when using select communication protocols such as NFC, minimal power may be required, minimizing the likelihood of a potential fault because of inadequate power (e.g., a mobile phone with a dead battery as compared to a chip that does not require a separate power supply). Thus, if an NFC mechanism is used in very close proximity between a vehicle and marker 145 (e.g., associated with one or more tires as discussed above with respect to a TPMS system), information may be transmitted from one or more markers 145 based on data previously communicated from the central authority to the marker without the need for a separate power supply. Similarly, data can be transmitted from the NFC mechanism associated with the vehicle to marker 145 and then selectively transmitted to central authority 115. Such an integrated approach minimizes issues with dissimilar communication devices such as smart phones using different communication protocols and also subject to unavailability (e.g., because of a dead battery or other concurrent usage). Additionally, time of day broadcast can autonomously be preprogrammed to the vehicle marker by the central authority 115 such that if central authority is unavailable or will be unavailable special messages can be preprogrammed.

The central authority 115 may gather road data and other information from various sources. For example, the central authority 115 may receive information about traffic delays from a municipality or city. This traffic information may be processed by the central authority 115 to create the updated road data to be sent to the marker 145. Further, the local transportation department (e.g., the Department of Transportation) may provide the central authority 115 with certain information about various roads such as bridge height, construction information, planned road closures, etc. Other services may also transmit information to the central authority 115 such as weather services, public safety services, etc.

The marker 145 may be a transmitter and/or receiver configured to communicate with the communication device 120. It may be located within or along a roadway. In one example, the marker 145 may be arranged within the road. In this example, the marker 145 may be maintained within the pavement similar to a reflective marker. The marker 145 may be flush with the road's surface or may be slightly raised above the surface. In the case where the communication device 120 is within a vehicle's tire, upon the tire crossing over the marker 145, the marker 145 and communication device 120 may exchange information. In one example, the communication device 120 may receive road data from the marker 145. In another situation, the marker 145 may receive vehicle data from the communication device 120. To communicate with each other, the marker 145 and communication device 120 may be in close proximity to one another. In the example where NFC technology is used, the two devices may be within inches of each other. Other radio frequency communication mechanisms may permit a larger distance while still allowing for communication between the marker 145 and the communication device 120. When using a TPMS, the communication device 120 may communicate with the marker 145 when the tire rolls over the marker 145. The communication device 120 may be located within the vehicle at other locations, such as the bumpers, doors, etc. Further, the markers 145 may be held in existing road structures, such as signs or mile markers.

The marker 145 may include a processor and a memory (not shown) and be configured to store one or both of the road data and vehicle data. The memory may include a database configured to store the road and/or vehicle data. The marker 145 may also have a power source configured to supply power to the marker 145 and possibly to the communication device 120, as described above. The power supply may include a battery, either rechargeable or replaceable. The marker 145 may include a direct current (DC) power supply and a transformer. The marker 115 may also be powered by an alternate current (AC) power supply. A battery backup unit may be used to supply power to the marker 145 in the event that the main power supply fails.

The marker 145 may communicate with the central authority 115 via any type of communication protocol including wired and wireless technologies. Communication may be facilitated by a wireless network such as Wi-Fi, Bluetooth, cellular networks, ad-hoc wireless networks (e.g., Zigbee® or Z-Wave), etc. The database 155 may be in communication with the central authority 115. The database 155 may maintain vehicle data for vehicles that have previously transmitted vehicle data to the central authority 115. That is, vehicles that have been in a certain vicinity or radius of the central authority 115, or municipality associated therewith, may have a vehicle log within the database 155 to maintain vehicle data accordingly. Road data may also be maintained in the database 155. A road log may be maintained for each major highway running through or close to the municipality associated with the central authority 115.

In yet another advantage of system 100, a municipality, such as a city, county, or any subset of a state responsible for managing transportation, may have an interest in knowing which vehicles travel their roadways. It may aid the officials in making decisions as to traffic management and structural improvements. A municipality may also have an interest in protecting their roadways by ensuring that the vehicles traveling thereon are of the appropriate weight and include the appropriate safety features to prevent damage to the roadway, its structures therein, and other vehicles. The roadways may be defined as a portion of a certain road within a radius of the central authority 115. The roadways, in one example, may be a stretch of highway extending through the municipality. The bounds of the roadway may be variably defined as a certain distance preceding a vehicle in the direction the vehicle is traveling. In one example, a roadway may be the current location of the vehicle plus ten (10) miles. In any event, system 100 may thus provide information of interest to improve decision making or inadvertent issues to both a driver and to the municipality in which a specific vehicle is traveling.

Figure 2:
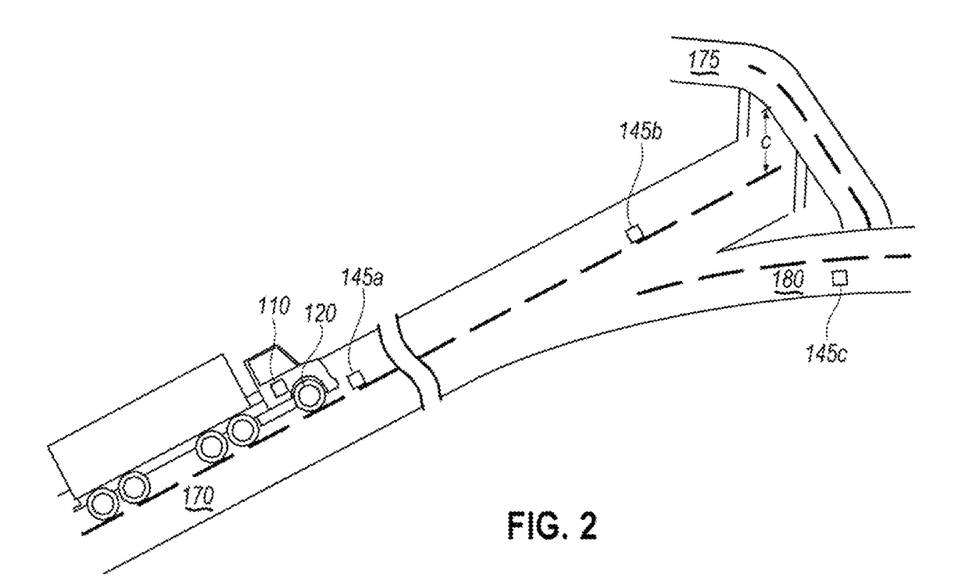
FIG. 2 is an exemplary diagram of a vehicle and roadway utilizing the accident prevention system.

FIG. 2 is an exemplary diagram showing a vehicle having a vehicle system 110. A roadway 170 may include a first marker 145a and a second marker 145b. The roadway 170 may have an obstruction 175 and an alternate route 180. The alternate route 180 may include a third marker 145c. The obstruction, by way of example only, may be a bridge with a low clearance height C. As the vehicle crosses the first marker 145a, the communication device 120 within the TPMS of the vehicle may receive road data from the marker 145a. This road data may include information about the upcoming obstruction 175, such as the clearance height of the bridge. The application 125 may then analyze the road data in view of the vehicle characteristics to determine whether the road data includes information that is of interest to the vehicle. In this example, the vehicle height may be compared with the clearance height to determine whether the vehicle is too tall to drive under the bridge. If the application 125 determines that the road data is relevant (e.g., the vehicle height exceeds that of the clearance height), the application 125 may send a command to the display unit 130. The display unit 130 may then alert the vehicle as to the upcoming obstruction 175. In one exemplary approach, as warnings are communicated from successive markers 145 to a vehicle and ignored the severity of the issue may be elevated, resulting in enhanced communication to the driver. Such enhanced communication may include such things as visual clues (e.g., increasing the frequency of the display, size of the message, color changes, blinking or the like) in selective combination with audio clues (e.g., alarms, bells or voice warnings). At an extreme, this command may include a pro-active remedial measure, such as instructing the vehicle to take an alternate route to avoid a collision with the bridge.

The second marker 145b may also receive vehicle data. By receiving vehicle data at the second marker 145b, the central authority 115 may determine that the vehicle is still traveling on the roadway 170 and not the alternate route 180. Alternatively, if vehicle data is collected at the third marker 145c, then the central authority 115 may determine that the vehicle has taken the alternate route 180. The central authority 115 may thus collect vehicle data at each of the markers 145. By collecting data from each of the markers 145, the central authority 115 may be capable of determining whether the vehicle complied with the remedial measures. For example, if the central authority 115 determines that the vehicle took the alternate route 180, as instructed via the display unit 130. However, the central authority 115 may also determine that the vehicle failed to comply with the instructions if vehicle data is subsequently received at marker 145b instead of marker 145c. By determining that the vehicle has failed to comply, the central authority 115 may determine what, if any, remedial measures to take against the vehicle. Such remedial action may include alerting the authorities or public service personal as to the potential problem created by the vehicle's non-compliance so that they may act accordingly. Another example of a remedial action may be to issue another warning to the user via the display unit 130. The remedial action may also include controlling the vehicle in a way so as to prevent the vehicle from continuing on its current route. For example, the central authority 115 may instruct the vehicle's governor to be activated to slow and ultimately move the vehicle to a stop. In another example, the braking system may be overridden and used to slow, and eventually stop, the vehicle.

While the markers 145a-c are described as being used to monitor the vehicle, the markers may also be used to collect vehicle data over a distance. Because the vehicle may be traveling at a high speed when it crosses a marker 145 within the road, the marker 145 may not receive the vehicle data in total. It may receive the VIN and a portion of the vehicle attributes. However, when the vehicle crosses another marker, the VIN and another attribute may be received. Thus, the markers 145a-c along a roadway 170 may iteratively collect vehicle data. The vehicle data may be transmitted to the central authority 115 and the central authority may log the data according to the VIN.

While the central authority 115 is described as performing this analysis, the application 125 may also analyze the road data and determine whether any remedial actions need to be taken based on the vehicle's behavior. This exemplary approach is described in greater detail with respect to FIG. 6 below.

Figure 3A:
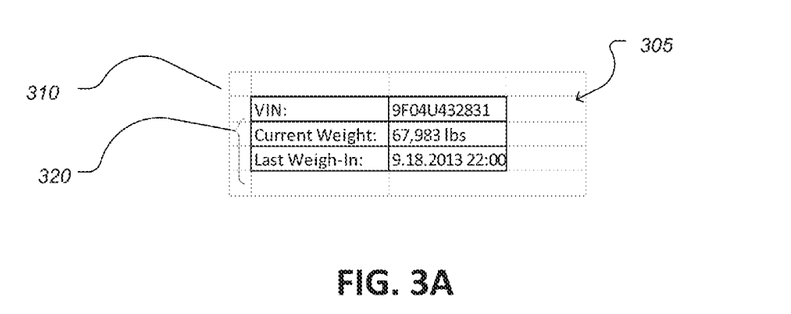
FIG. 3A is an exemplary data table showing exemplary vehicle data.

FIG. 3A is an exemplary data table showing exemplary vehicle data 305 for a vehicle. The vehicle data may include a static vehicle attribute 310 such as a VIN, and a dynamic vehicle attribute 320, such as the current weight of the vehicle, as well as the date and time of the last vehicle weigh-in. Other vehicle attributes may also be included in the vehicle data. These attributes may include other types of static vehicle information such as the height, length, towing capacity, average fuel mileage, etc. Dynamic attributes may also include safety information; such as the last time the vehicle was serviced (e.g., brakes checked, oil changed, etc.) The attributes may further include driver information about the driver associated with the vehicle, such as the driver's driving history and driving record, experience, certain medical conditions, etc. In yet an additional example, a driver herself may be able to change select dynamic vehicle attributes 320 such as an indication that she is carrying an oversized load.

In one example the vehicle weight may be determined at the weight station. The weight station may include a marker 145. The marker 145 at the weight station may interface with the scale, and may be used to transmit the recorded weight from the scale to the communication device 120. The application 125 may then use this weight to update the vehicle data within the vehicle system 110. The marker 125 may also transmit this weight information to the central authority 115, thus indicating that the vehicle has been weighed. The central authority 115 may then determine whether the vehicle is in compliance with any weight restrictions.

As explained, the vehicle data may be maintained by the vehicle system 110 within the user experience application 125, or other database (not shown). The vehicle data may be transmitted via the communication device 120 to the marker 145. The central authority 115 may analyze the data to determine if the vehicle is in compliance with certain restrictions and requirements such as weight limits, safety features, etc. Additionally or alternatively, the application 125 may analyze the vehicle data in view of received road data.

The database 155 may also maintain a vehicle log including at least a portion of the vehicle data. The central authority 115 may compare vehicle attributes of the incoming vehicle data (i.e., the data received at the marker 145) with the vehicle attributes within the log. In one example, the central authority 115 may determine whether or not the weight of the vehicle has changed between the two data points. That is, the central authority 115 may compare the current weight of a vehicle as indicated in the vehicle data with a previously received vehicle weight. In another example, the central authority 115 may look to see whether a safety attribute has changed. In this example, if the vehicle data previously indicated that the vehicle's brakes required service, the central authority 115 may analyze the incoming vehicle data to determine whether this safety issue had been addressed since the last receipt of vehicle data. If the safety attribute has not been addressed, then the central authority 115 may determine that a remedial measure may be required, such as fining the vehicle owner for lack of compliance.

Figure 3B:
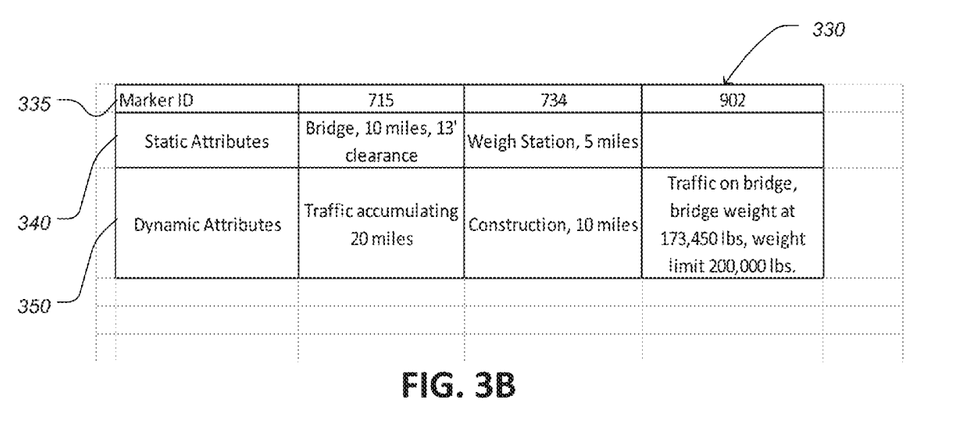
FIG. 3B is an exemplary data table showing exemplary road data.

FIG. 3B is an exemplary data table showing exemplary road data 330 for a roadway. As explained, a roadway may be any road, or portion of a road. The roadway may be assumed herein to be the road on which the vehicle is traveling. It may also be an upcoming road or intersection. Each roadway may be associated with at least one marker 145. In some situations, a roadway may include multiple markers 145, each arranged at various intervals along the roadway.

The road data 330 may include physical road characteristics about the current roadway. These may include physical obstructions, weather and traffic updates, etc. The road data 330 may include a marker identification number (marker ID 335.) It may also include at least one static attribute 340 and at least one dynamic attribute 350. The static attribute 340 may be an unchanging, or fixed characteristic of the roadway such as a bridge, speed limit, weight station, etc. In the exemplary road data of FIG. 3B, one of the static attributes may be an upcoming bridge, ten (10) miles ahead, with a thirteen (13) foot clearance. The static attribute may also be a weight station, five (5) miles ahead. The dynamic attributes 350, as shown by way of example in FIG. 3B, may include roadway attributes that change over time. These attributes may include information about the roadway such as traffic, approaching weight limits, construction, weather, etc. Specific examples, as shown in FIG. 3B, may include traffic accumulating twenty (20) miles ahead, construction ten (10) miles ahead and a bridge with a weight limit of 200,000 lbs with traffic accumulating thereon currently weighing 173,450 lbs, which in one example is the combined weight of n vehicles currently on the bridge at that instant, but subject to some potential estimation as vehicles approach and leave the bridge. In another example, the accumulated weight may be the anticipated vehicle weight at a predetermined estimated time in the future based on the information being gathered real-time by way of markers 145 as vehicles approach the bridge and potentially analyzed by the central authority 115.

As explained above, the road data may be transmitted to the vehicle system 110 via the marker 145 and communication device 120. The road data may be maintained within the database 155. The user experience application 125 may analyze the road data to determine whether the data is relevant to the vehicle. The user experience application 125 may use vehicle data to analyze the road data. In one example, the application 125 may receive road data from the marker identified as marker 902. This road data includes a dynamic attribute indicating that the current roadway has an upcoming bridge with a weight limit of 200,000 lbs. Due to traffic, 173,450 lbs of weight is already on the bridge. The application 125 may determine, in view of the dynamic attributes of the road data and the vehicle weight as indicated in the vehicle data (e.g., 67,983 lbs), that the vehicle could cause the weight limit of the bridge to be exceeded (i.e., 173,450 lbs+67,983 lbs>200,000 lbs). The application 125, upon making the determination that the road data is relevant, at least because the weight limit of the bridge could be exceeded, may transmit a command to the display unit 130 instructing the display unit 130 to display a command indicating that an alternate route is required in order to avoid exceeding the weight limit.

The central authority 115 or application 125 may then monitor the vehicle to be sure that the vehicle complies with the instructions.

The vehicle data may also provide information, via the dynamic vehicle attributes, concerning current driving conditions. In one example, the vehicle data may indicate whether the windshield wipers are on. If the central authority 115 receives vehicle data from a plurality of vehicles indicating that the windshield wipers are on, the central authority 115 may determine that it is precipitating. In order to determine whether it is precipitating, a predefined percentage of the vehicles passing by a marker 145 within a given amount of time may be determined to have their windshield wipers on.

In addition to receiving the road data, the application 125 may also receive other types of data, such as GPS data. This GPS data may be used by the application 125 to determine the appropriate remedial route. The GPS data may be received by a local GPS unit (not shown) within the vehicle. It may also be received from the marker 145 as part of the road data.

Figure 4:
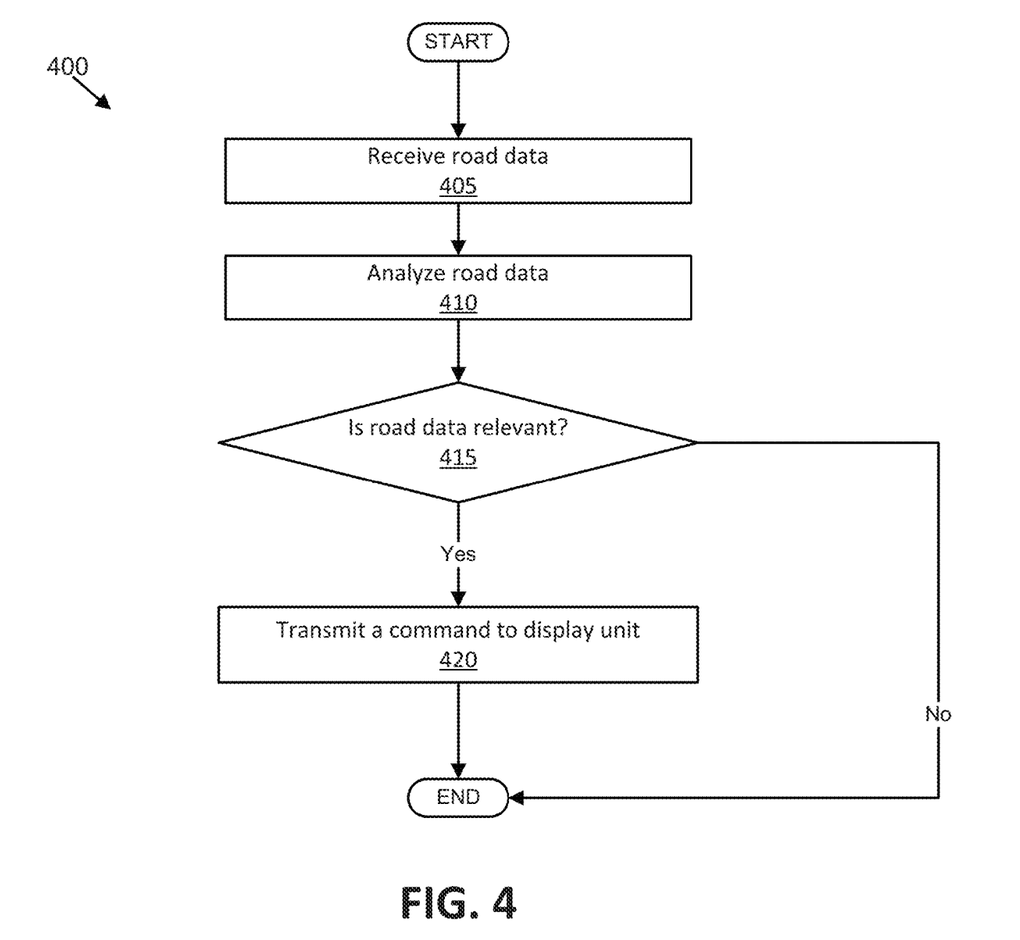
FIG. 4 is an exemplary process for analyzing road data.

FIG. 4 shows an exemplary process 400 for analyzing road data received from marker 145. The process begins at block 405 where the communication device 120 of the vehicle system 110 receives road data from the marker 145. The process proceeds to block 410.

At block 410, the road data is analyzed at the application 125 within the vehicle system 110. The application 125, as explained above, may review the road attributes included in the road data to determine whether the road attributes are relevant to the current vehicle at step 415. If the road data is determined to be relevant, the process proceeds to block 420, if not, the process ends.

At block 420, the application 125 transmits a command to the display unit 130 to instruct the display unit 130 to display a message to the user in response to the determination that the data is relevant.

The process then ends.

Figure 5:
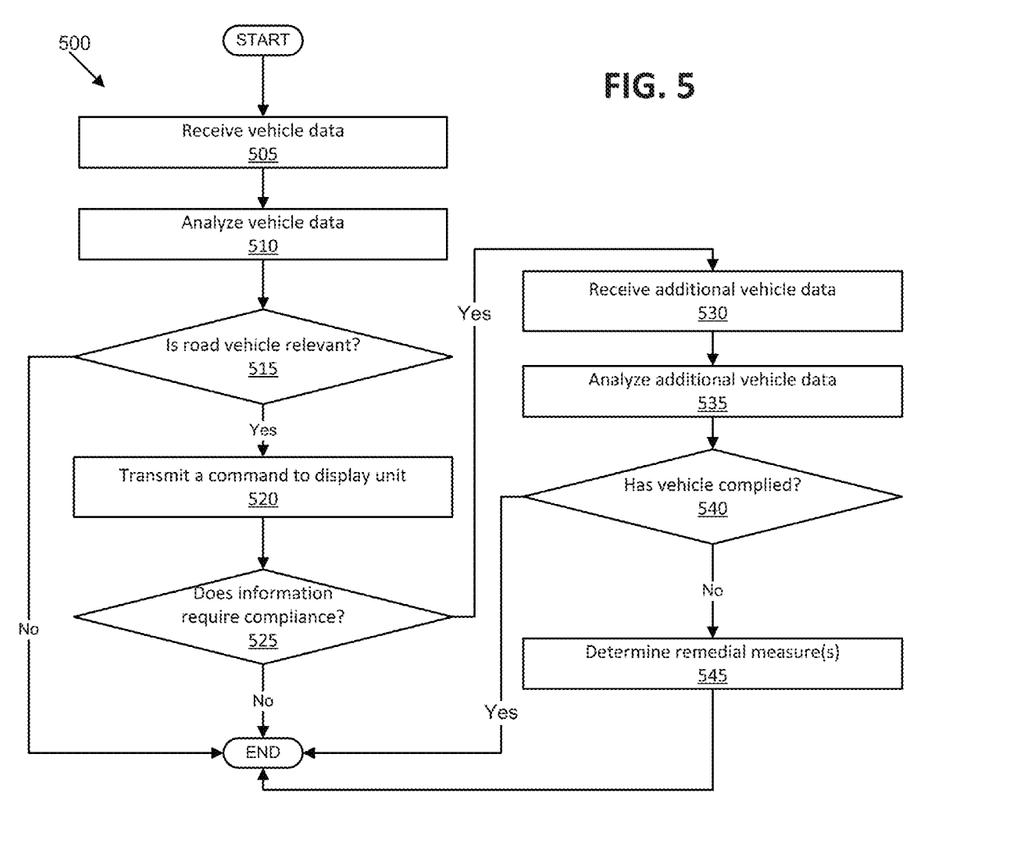
FIG. 5 is an exemplary process for analyzing vehicle data.
Figure 6:
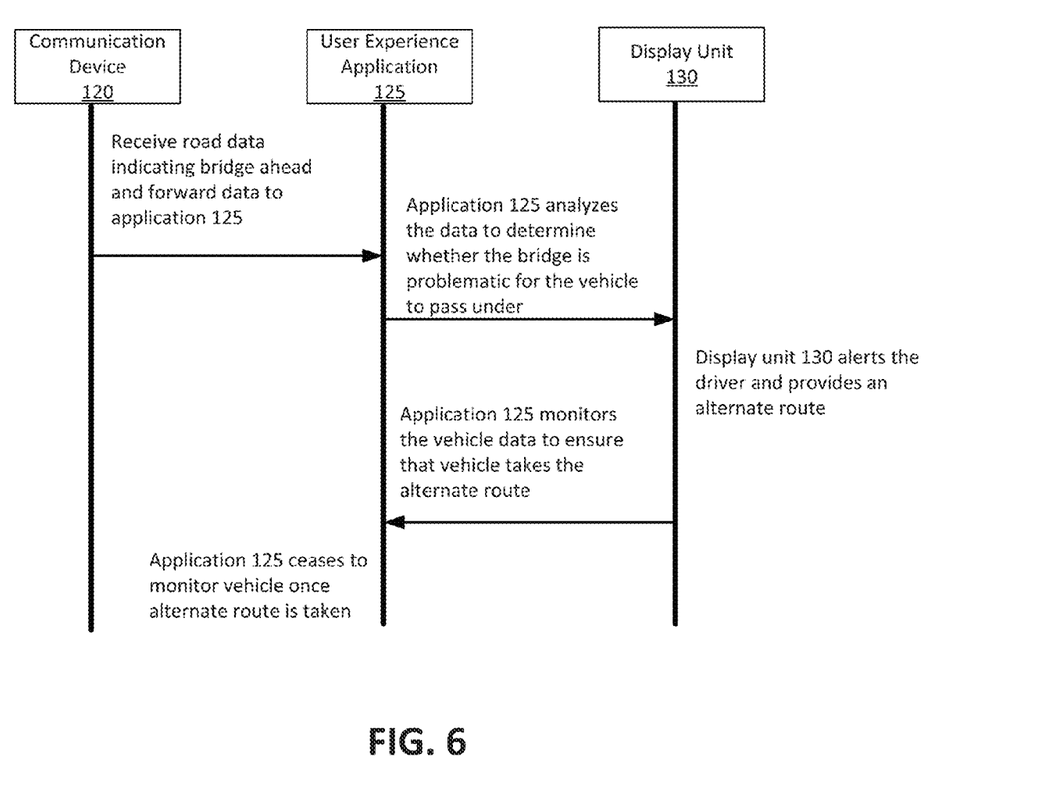
FIG. 6 is an exemplary process diagram for the accident prevention system.

FIG. 5 shows an exemplary process 500 for analyzing vehicle data received at the marker 145. The process begins at block 505 where vehicle data is received from the communication device 120 at the marker 145. The central authority 115 may then analyze the vehicle data at block 510 to determine, at block 515, whether the vehicle data is relevant. As explained, the vehicle data may be determined to be relevant if an issue with the vehicle's path of travel is realized (e.g., construction, bridge, traffic), or if a safety issue with the vehicle is realized (e.g., vehicle weight, brakes, etc.). If the vehicle data is relevant, the process proceeds to block 520. If not, the process ends. In one example, the vehicle data may include information about the vehicle's last weigh-in. If the vehicle's last weigh-in exceeds a predefined amount of time, or a predefined distance, then the vehicle may be required to weigh-in at the next weight station. Thus, the vehicle data may be determined to be relevant if the data indicates that the vehicle should weigh-in. While the analyzing is described as being done by the central authority 115, the analyzing may also be done by the application 125 within the vehicle system 110, as shown in FIG. 6.

At block 520, a command may be transmitted to the display unit 130, similar to block 420. The command may warn the driver of an upcoming issue with the vehicle, such as a safety issue or non-compliance issue (e.g. missed weight station.) Using the weigh-in example above, the command may instruct the display unit 130 to provide a message such as "Weigh-in required, stop at next weight station." When application 125 performs the analysis of the vehicle data, the application 125 may transmit the command to the display unit 130. When the central authority 115 analyzes the vehicle data, the command may be transmitted to the display unit 130 via wireless communication.

At block 525, it is determined whether the relevant information requires compliance. That is, based on the analysis of the vehicle data, it is determined whether the relevant information is important enough to require vehicle compliance with the instructions provided via the display 130. In one example where the vehicle has not been weighed for a certain amount of time, compliance may not be necessary because there is no immediate harm created by an overweight vehicle. However, in another example where the vehicle data indicates that the vehicle's height exceeds the clearance of an upcoming bridge, compliance may be necessary to prevent destruction or injury. The analysis may be done either at the central authority 115 or at the application 125, as described. Certain vehicle and road attributes may be flagged within the database 155 or application 125 to require compliance. If it is determined that compliance is necessary, the process proceeds to block 530. If not, the process ends.

At block 530, in response to the information requiring compliance by the vehicle, the application 125 and/or central authority 115 may monitor the vehicle by subsequently receiving additional vehicle data. The data may be received by a subsequent marker 145. In the example shown in FIG. 2, the additional data may be received by either the second marker 145b or third marker 145c. The data may also be received via a wireless network as described above.

At block 535, the additional vehicle data may be analyzed by the application 125 of the central authority 115 to determine whether the vehicle complied with the instructions provided by the display unit 130. Referring to the example above, if the vehicle was instructed via a HUD unit to take an alternate route, the additional vehicle data may then be analyzed to determine whether it indicates that the alternate route was taken. In the example of FIG. 2, if the vehicle was instructed to take an alternate route in block 520, receipt of vehicle data associated with that vehicle at the third marker 145c may indicate that the vehicle did comply with the command and take the alternate route. Alternatively, receipt of vehicle data at the second marker 145b may indicate that the alternate route was not taken.

In addition to the receipt of data at specific markers 145 indicating the location of the vehicle, the vehicle data itself may identify the current location of the vehicle. Further, GPS may also be used to locate the exact location and route of the vehicle.

If it is determined that the vehicle has complied with the instructions, the process ends. If it is determined that the vehicle has not complied with the instructions, the process proceeds to block 545.

At block 545, in response to determining that the vehicle did not comply with the instructions, at least one remedial measure is determined. The central authority 115 and/or the application 125 may perform this determination. The remedial measures may include controlling portions of the vehicle in order to force the vehicle to physically comply. For example, the application 125 may activate the vehicle's governor, thus slowing the vehicle and preventing the vehicle from proceeding on its current route. This may be an appropriate approach when continuing on the current route may cause a collision (e.g., in the example of a low bridge clearance height.) In another example, a remedial measure may include a less drastic approach, such as imposing a fine on the vehicle in response to the vehicle missing a weigh-in or exceeding a speed limit. Once the remedial measure had been determined and imposed, the process ends.

FIG. 6 is an exemplary process diagram for analyzing road data received from a marker 145 at the vehicle system 110. In the example in FIG. 6, the road data indicates that the roadway includes an upcoming bridge. The road data may include the clearance height of this bridge. The user experience application 125 may then analyze the data in view of the vehicle attributes (e.g., vehicle height) to determine whether it would be problematic for the vehicle to pass under the bridge in view of the two known heights. Upon determining that the bridge is too low for the vehicle to pass under, the display unit 130 may alert the driver of this fact and provide instructions for the driver to take an alternate route in order to avoid the bridge. Once these instructions are provided, the application 125 may monitor the vehicle to make sure that the vehicle proceeds along the alternate route. Once the application 125 receives information (i.e., additional vehicle data) indicating that the vehicle has complied and taken the alternate route, the application may cease to monitor the vehicle's location.

Figure 7:
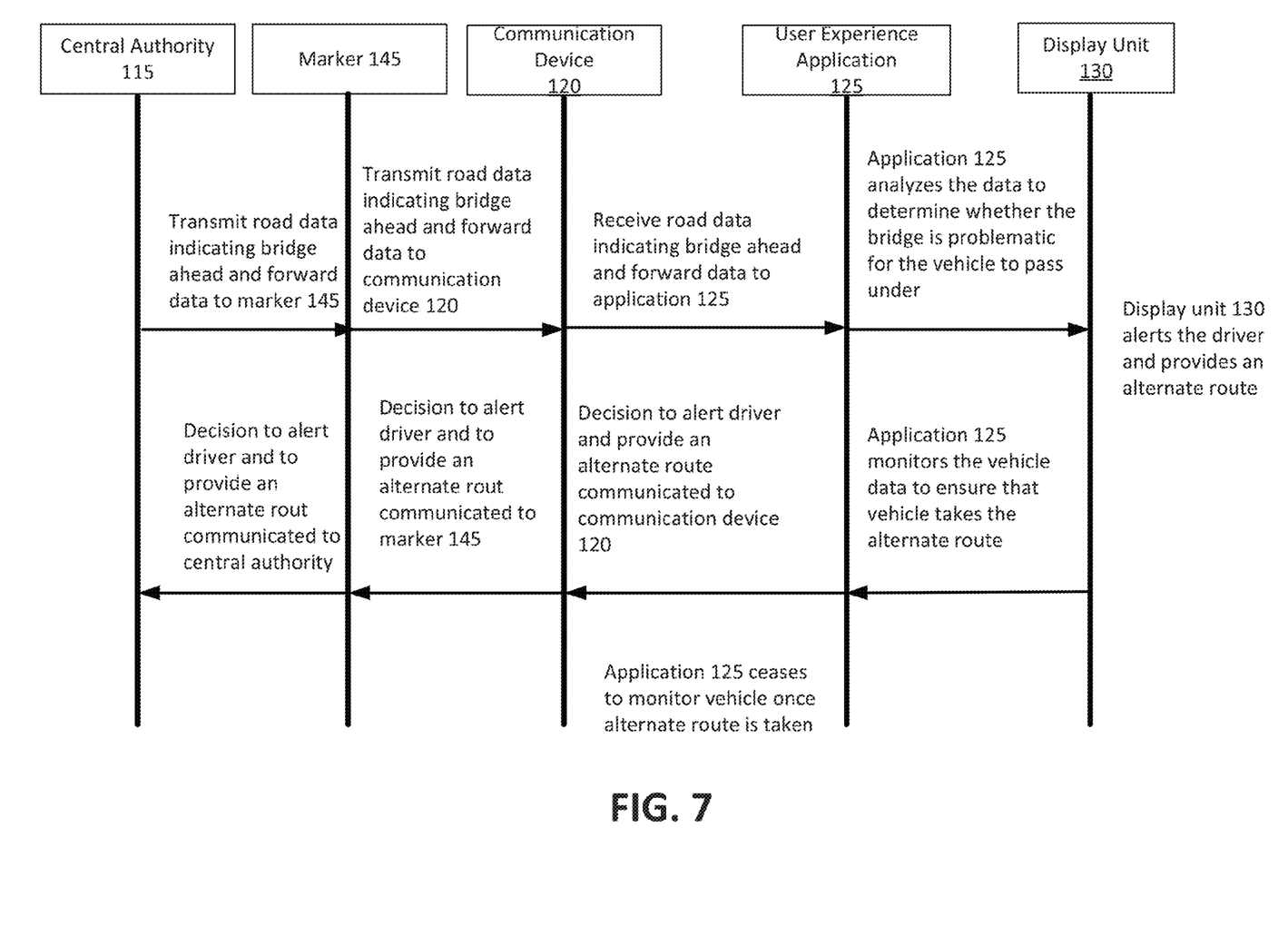
FIG. 7 is an exemplary process diagram for the accident prevention system.

FIG. 7 is an exemplary process diagram similar to that of FIG. 6, but including communication outside of the vehicle. For example, the communication device 120 receives road data from a remote communication device such as marker 145 that in turn is in communication with the central authority 115. The decision to alert the driver and provide an alternate route is communicated by user application 125 to the communication device 120, and from there to marker 145 and finally from marker 145 to central authority 115. In turn, the central authority 115 may communicate the information to a third party such as owner of the vehicle, a distribution clearinghouse associated with the vehicle or the like. The application 125 may also use the system 100 to communicate to a third party when it ceases to monitor the vehicle once the alternate route is taken.

Figure 8:
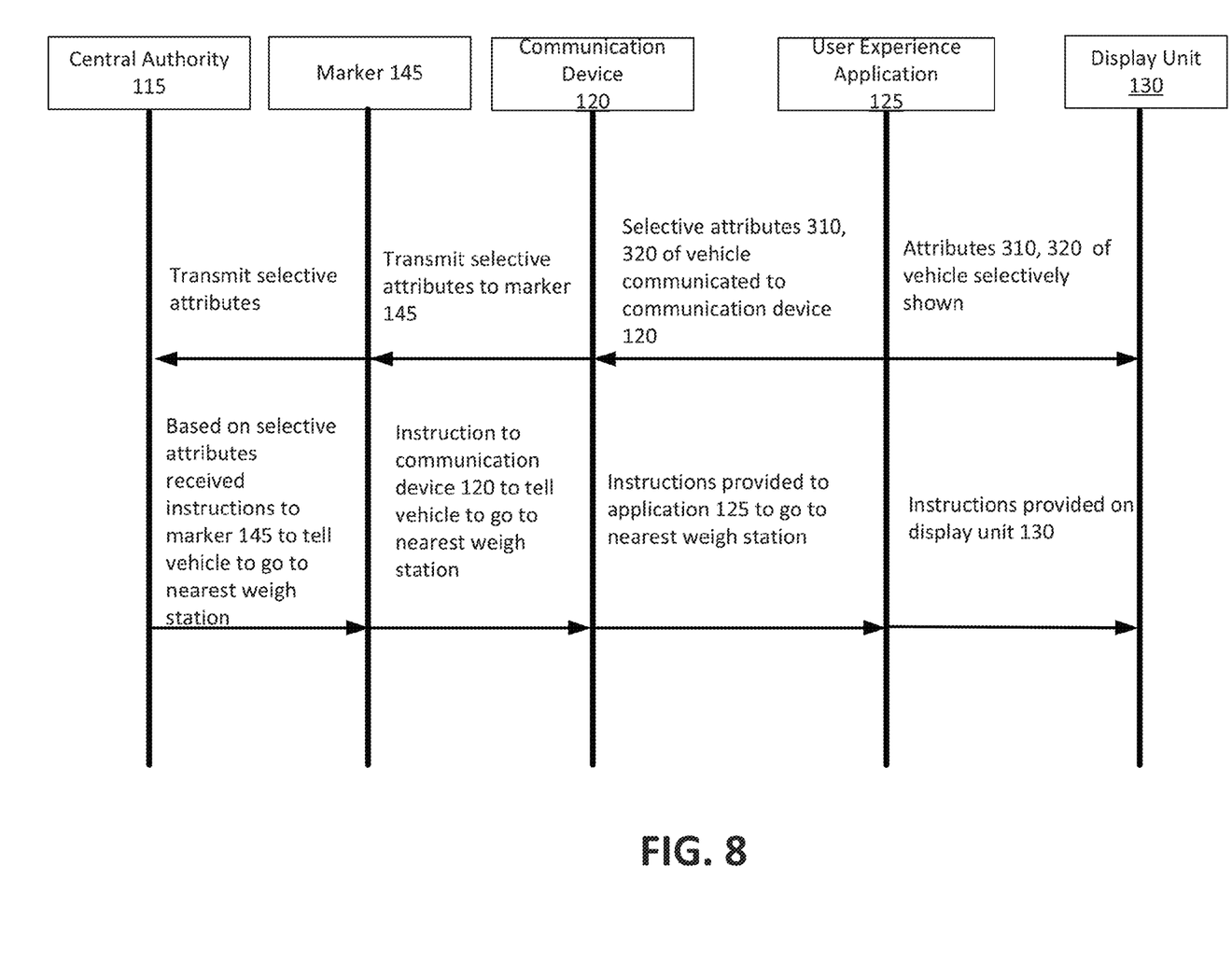
FIG. 8 is an exemplary process diagram for the accident prevention system.

FIG. 8 is an exemplary process diagram wherein dynamic attributes 320 of the vehicle system 110 itself may be communicated to the central authority 115 for possible consideration. In the example, the dynamic attributes 320 collected relate to both a geographic location and time period at rest suggesting that the vehicle has picked up or dropped off a load. Once the vehicle begins moving again such that communication device 120 is in communication with one or more remote communication devices such as a marker 145 the relevant dynamic attributes 320 may be communicated from marker 145 to central authority 115 and then to a third party such as the owner of the vehicle. In turn, the owner of the vehicle may instruct the clearing house 115 to request that markers 145 inform user application 125 by way of communication device 120 to stop at the next available weigh station so that an independent determination of the vehicle weight may be made. The request may be communicated from user application 125 to display unit 130 along with information concerning the location and timing to get to the weigh station. Significantly, static attributes 310 such as a vehicle identification number (VIN) may need to be part of the communication process along with appropriate authentication so that the proper information and related instructions are communicated back and forth between the application 125 and the central authority 115, particularly when the guidance may be more specific to a particular circumstance.

Accordingly, a system is disclosed using markers within a roadway to transmit and receive data from a communication device within a vehicle (e.g., NFC chip within a TPMS). The system analyzes data from one or both of a central authority and vehicle. By analyzing this data, the safety of the vehicle may be better maintained. Further, municipalities may have additional control over vehicles' compliance with their regulations, further increasing the safety of the roadway.

In general, computing systems and/or devices, such as vehicle system 110, central authority 115, etc., may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the vehicle system 110 and central authority 115 generally include computer-executable instructions such as the instructions of the application 125 and other applications within the central authority 115, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

What is claimed as new and desired to be protected by Letters Patent of the United States is:

1. A vehicle system comprising:
 a display unit;
 a communication device, having a processor and a memory, configured to receive from at least one remote communication device in at least one fixed location road data indicating at least one physical road characteristic and including at least one dynamic road attribute that includes at least a cumulative weight on a road segment; and
 an application in communication with the communication device and configured to:
 analyze the road data in view of at least one vehicle attribute included in vehicle data, the at least one vehicle attribute including at least one dynamic vehicle attribute that includes at least a vehicle weight, by comparing the at least one dynamic road attribute and the at least one dynamic vehicle attribute,
 determine whether the road data is relevant based on the analysis of the road data;
 transmit, in response to the road data being relevant, a command to the display unit to display information based on the analysis of the road data; and
 wherein comparing the at least one dynamic road attribute and the at least one dynamic vehicle attribute includes adding the vehicle weight to the cumulative weight on the road segment to determine if a weight limit of the road segment would be exceeded if the vehicle proceeds onto the road segment.

2. The system of claim 1, wherein the application is further configured to monitor the vehicle attribute to determine whether the vehicle is in compliance with the displayed information.

3. The system of claim 2, wherein the monitoring includes receiving additional vehicle information and comparing the additional vehicle information with the command to determine whether the vehicle has complied with the command.

4. The system of claim 3, wherein the application is further configured to apply a remedial measure in response to determining that the vehicle has not complied with the command.

5. The system of claim 4, wherein the remedial measure is at least one of imposing a fine, activating a governor of the vehicle, and alerting public service personnel.

6. The system of claim 1, wherein the analyzing includes comparing at least one static attribute of the road data with at least one dynamic attribute of the vehicle data.

7. The system of claim 1, further comprising a short range communication protocol capable of transmitting over a distance of less than approximately fifty feet and wherein the road data is received from the remote communication device distanced from the communication device and configured for communicating with the communication device when a vehicle housing the communication device passes by the remote communication device.

8. The system of claim 7, wherein the communication device is associated with a tire of the vehicle.

9. A method comprising:
receiving, from at least one remote communication device in at least one fixed location, road data indicative of at least one physical road characteristic and including at least one dynamic road attribute that includes a cumulative weight on a road segment;
receiving vehicle data having at least one vehicle attribute including at least one dynamic vehicle attribute that includes a vehicle weight;
analyzing the vehicle data in view of the road data by comparing the at least one dynamic road attribute and the at least one dynamic vehicle attribute;
determining whether the road data is relevant based on the analyzing;
transmitting, in response to the road data being relevant, a command to a display unit to display information based on the analysis of the road data; and
wherein comparing the at least one dynamic road attribute and the at least one dynamic vehicle attribute includes adding the vehicle weight to the cumulative weight on the road segment to determine if a weight limit of the road segment would be exceeded if the vehicle proceeds onto the road segment.

10. The method of claim 9, further comprising monitoring the vehicle attribute to determine whether the vehicle is in compliance with the displayed information.

11. The method of claim 10, wherein the monitoring includes receiving additional vehicle information and comparing the additional vehicle with the command to determine whether the vehicle has complied with the command.

12. The method of claim 11, further comprising applying a remedial measure in response to determining that the vehicle has not complied with the command.

13. The method of claim 12, wherein the remedial measure is at least one of imposing a fine, activating a governor of the vehicle, and alerting public service personnel.

14. The method of claim 9, wherein the analyzing includes comparing at least one static attribute of the road data with at least one dynamic attribute of the vehicle data.

15. A non-transitory computer-readable medium tangibly embodying computer-executable instructions comprising instructions that when executed by a processor cause the processor to:
receive, from at least one remote communication device in at least one fixed location, road data indicative of at least one physical road attribute and including at least one dynamic road attribute that includes a cumulative weight on a road segment;
receive vehicle data having at least one vehicle attribute including at least one dynamic vehicle attribute that includes a vehicle weight;
analyze the vehicle data in view of the road data by comparing the at least one dynamic road attribute and the at least one dynamic vehicle attribute;
determine whether the road data is relevant based on the analyzing; and
transmit, in response to the road data being relevant, a command to a display unit to display information based on the analysis of the road data; and
wherein comparing the at least one dynamic road attribute and the at least one dynamic vehicle attribute includes adding the vehicle weight to the cumulative weight on the road segment to determine if a weight limit of the road segment would be exceeded if the vehicle proceeds onto the road segment.

16. The medium of claim 15, wherein the instructions cause the processor to monitor the vehicle attribute to determine whether the vehicle is in compliance with the displayed information.

17. The medium of claim 15, wherein the monitoring includes receiving additional vehicle information and comparing the additional vehicle information the command to determine whether the vehicle has complied with the command.

18. The system of claim 1, wherein the communication device is configured to receive power from the remote communication device.

19. The system of claim 1, wherein the communication device is configured to iteratively transmit a plurality of vehicle attributes to a plurality of successive remote communication devices.

* * * * *